United States Patent [19]
Ruehl et al.

[11] Patent Number: 5,149,132
[45] Date of Patent: Sep. 22, 1992

[54] SPLIT REAR TRUCK FRAME

[75] Inventors: Phillip C. Ruehl, Elm Grove; Benjamin E. Coursin, Milwaukee, both of Wis.

[73] Assignee: A. O. Smith Corporation, Milwaukee, Wis.

[21] Appl. No.: 650,057

[22] Filed: Feb. 4, 1991

[51] Int. Cl.[5] .............................................. B62D 21/00
[52] U.S. Cl. .................................... 280/800; 280/785
[58] Field of Search ............... 280/785, 797, 798, 799, 280/800

[56] References Cited

U.S. PATENT DOCUMENTS

| | | | |
|---|---|---|---|
| Re. 20,197 | 12/1936 | Crowe | 280/797 |
| 1,638,948 | 8/1927 | Masury et al. | 280/798 |
| 1,698,179 | 1/1929 | Walker | 280/800 |
| 2,173,525 | 9/1939 | Wallace | 280/797 |
| 2,344,378 | 3/1944 | Wagner | 280/797 |
| 2,603,506 | 7/1952 | Johnson | 280/800 |
| 2,794,650 | 6/1957 | Schilberg | 280/790 |
| 3,177,005 | 4/1965 | Duero et al. | 280/788 |
| 3,177,032 | 4/1965 | Jaskowiak | 296/35.1 |
| 3,606,437 | 9/1971 | Pierce | 296/35.1 |
| 3,614,124 | 10/1971 | Schwabenlender | 280/788 |

Primary Examiner—Kenneth R. Rice
Attorney, Agent, or Firm—Andrus, Sceales, Starke & Sawall

[57] ABSTRACT

A truck frame (10) supports the non-continuous structural components of a truck, including a front cab (12) and a rear load box (14). The truck frame includes a front frame (16) supporting the front cab, and a rear frame which is split into a front portion (70) supporting the front cab (12) and the rear load box (14), and a rear portion (72) supporting the rear load box (14). The front and rear portions of the truck rear frame have siderails (74, 76, 78, 80) which are separately formed structural components attached to each other at joints (82, 84) at the rear spring front hangers (48, 54).

24 Claims, 3 Drawing Sheets

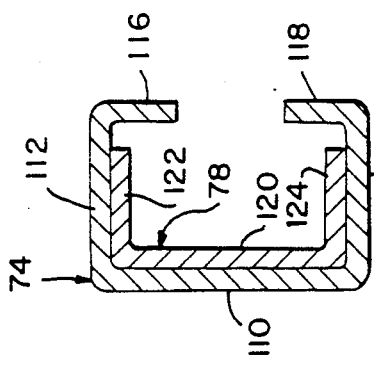
FIG. 5
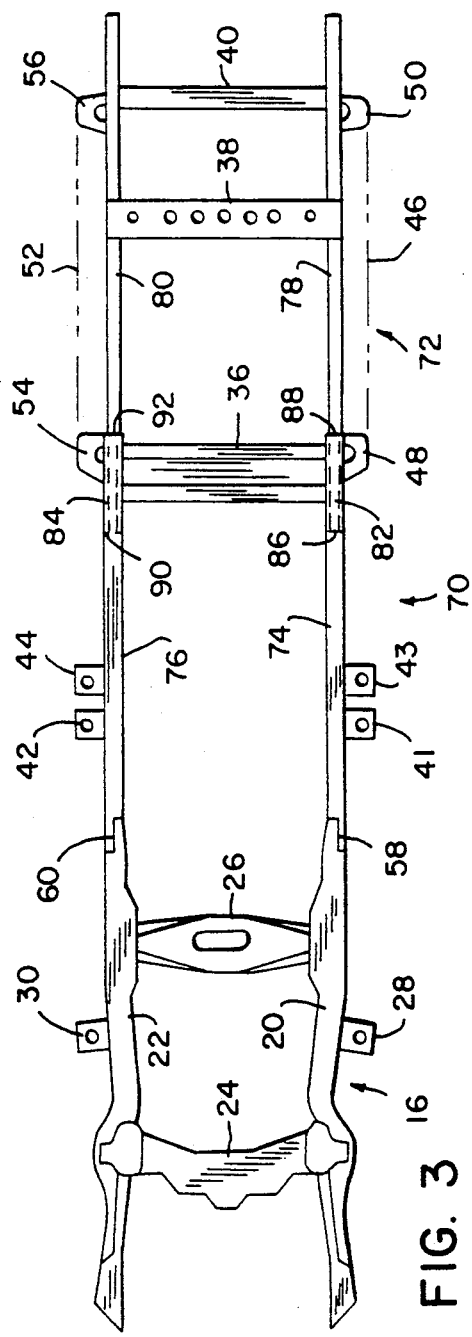
FIG. 3
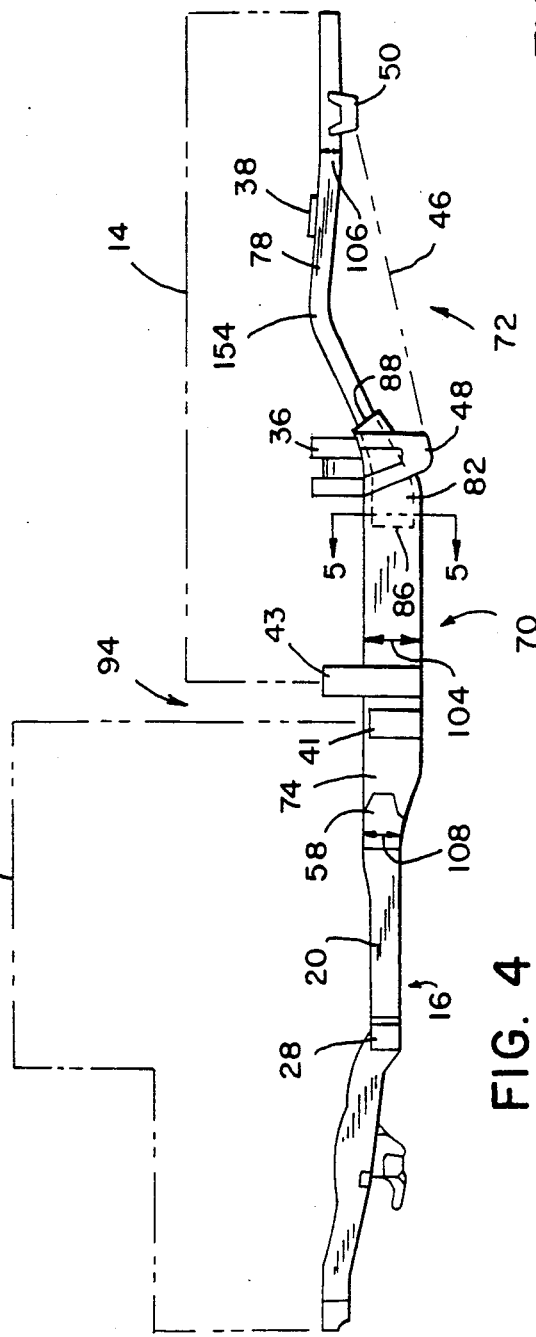
FIG. 6
FIG. 4

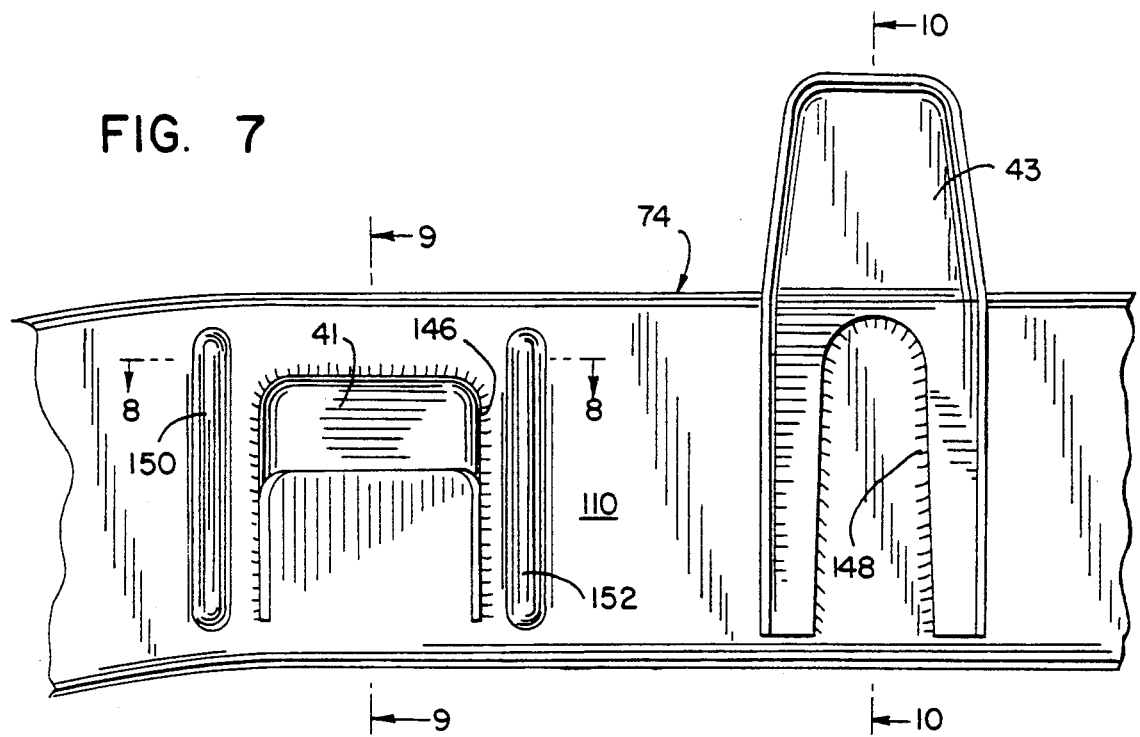
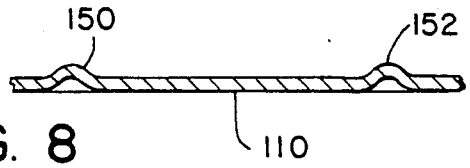
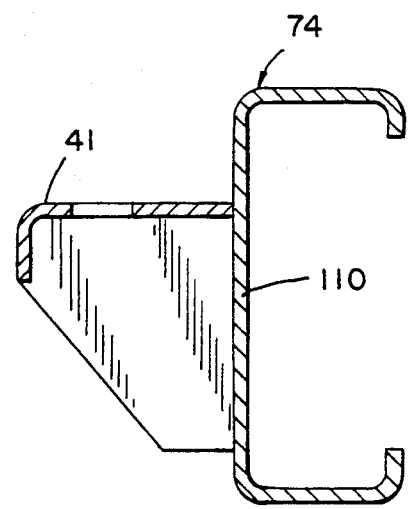
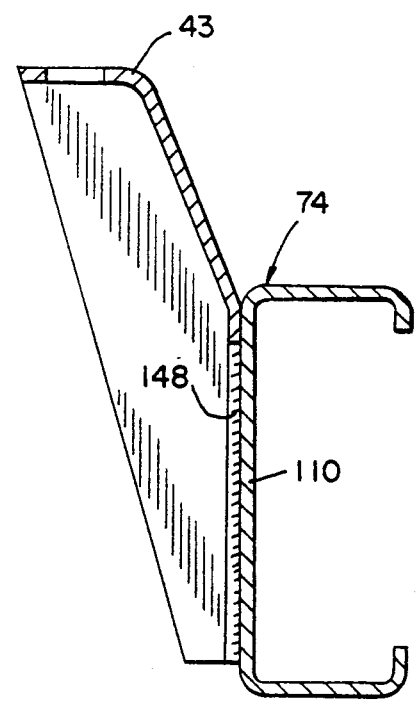

SPLIT REAR TRUCK FRAME

BACKGROUND

The invention relates to truck frames for supporting the non-continuous, structural components of a truck, the components including a front cab and a rear load box.

Truck frames known in the prior art include a front frame for supporting the front cab, and a rear frame for supporting the front cab and the rear load box. The siderails of the front and rear frames are connected at joints beneath the front cab. Each rear frame siderail is a continuous one-piece member. Various attempts have been made in the prior art to reduce the weight and cost of the rear frame, and typically involve reducing the gauge of the frame material and adding reinforcement for strength where needed. Added parts involve detail and assembly costs such that in this approach the weight and cost goals can work against each other.

SUMMARY

The present invention achieves cost and weight reductions, but along a different approach than the prior art. In the present invention, each siderail of the truck rear frame is split into structural components formed separately but attached at a designated location and orientation. In one embodiment, prior eleven to eleven and one-half foot rear siderails are each replaced by two six foot siderails overlapped by one-half to one foot.

In one aspect, the invention provides significant weight reduction, approaching 25%.

In another aspect, the invention has pleasantly been found to further provide significant cost reductions, both in material cost and in manufacturing cost. In one desirable application, the invention enables coil-fed sheet steel to be cut off cross-coil with a knife edge or other cutting tool. This provides steel utilization approaching 100%. Sheet steel is available in six foot coil rolls, but not eleven foot coil rolls. Hence, in the prior art, to form an eleven foot long rear siderail, the sheet steel is longitudinally cut from the coil and then blanked, which limits steel utilization to 90%. If a vertically offset siderail portion is needed for the rear wheels, a separate "kick-up" or "edge-bend" operation is performed to provide such offset using a pre-cut rectangular strip prior to blanking. Alternatively, in the prior art, the vertical offset is provided by using a die with the required shape to form such vertical offset during the blanking operation, which eliminates the necessity for a kick-up operation. Perhaps five blanks could be cut from one longitudinal sheet. However, the latter alternative suffers from only a 70% steel utilization factor. The present invention enables steel utilization approaching 100% because a six foot siderail is cut cross-coil from a six foot roll by a cutting tool, or by blanking, and increases steel utilization from the prior 70%-90% factor to a near 100% factor by avoiding the contour scrap at the top and bottom of a longitudinally cut sheet. Up to 2,000 blanks might come from one coil set-up. If a vertically offset siderail portion is needed for the rear wheels, the present invention enables use of a coil-fed cut-off tool having a given shape to provide the vertical offset during the cutting operation from the roll. This maintains a near 100% utilization factor, notwithstanding the noted vertical offset, which was not possible in the prior art. The invention thus provides significant reduction in material cost. The invention also provides reduction in manufacturing cost by eliminating the noted separate kick-up operation for forming a vertical offset siderail portion. The achievement of both reduced material cost and reduced manufacturing cost, in combination with the noted substantial weight reduction, and manufacturing flexibility, is considered a significant advance in the art, and provides results which were previously incompatible in the art.

In another aspect the elimination of the kick-up or edge-bend operation allows the use of higher strength siderail steel without the prior risk of splitting during forming.

In another aspect, the invention enables smaller less expensive tooling, shorter tooling lead time, and smaller presses for forming the sheet material after it is cut off the roll. The use of smaller presses is particularly advantageous because it in turn enables faster cycle times, i.e. the smaller press ram moves faster than a larger press ram. Faster cycle time is desirable because it enables a single set of tooling to provide a high feed-through rate, and eliminates the need for further sets of duplicate tooling which would otherwise be required for higher through-put. The invention thus affords significant manufacturing efficiencies by enabling more frames to be processed in less time and with less tooling cost.

In another aspect, the invention provides double stock thickness where needed at highly stressed rear spring front hangers, and enables minimum required gauge material to be provided fore and aft thereof.

In another aspect, the invention eliminates the need for forming operations around rear spring front hanger rivets otherwise needed for strengthening same.

In another aspect, the invention reduces required manpower and/or handling equipment. For example, one man can handle a twenty-five pound six foot siderail. However, an eleven foot siderail of twice or more the weight requires two men and/or mechanized handling equipment.

In another aspect, the invention enables smaller simpler siderail sections, which increases out-sourcing possibilities for tooling and/or manufacturing. For example, large presses and kick-up presses are sparse, and typically require high transportation costs to ship the formed parts to satellite assembly plants. The present invention eliminates such transportation costs by enabling local sourcing and forming of the parts.

In another aspect, the invention enables wide, lipped flanges and deep, thinner web sections for high bending moment areas between the front cab and rear load box, without the penalty of extra material or section stock otherwise carried by the rear, lightly loaded, siderail segment or trimmed off as scrap.

In another aspect, the invention allows an embodiment providing conversion of the rear siderail section to a cross-sectional hat shape while retaining a lipped channel siderail section forward thereof. This eliminates unique left and right hand rear siderail tooling, and the fabrication of and inventory of left and right hand detail parts, including from and rear hangers for the rear spring, which saves substantial tool and unit cost and weight.

In another aspect, the invention allows the selection of an alternate material, such as aluminum or a lighter gage or lower strength steel, for the more lightly loaded rear section of the siderail.

BRIEF DESCRIPTION OF THE DRAWINGS

Prior Art

Present Invention

FIG. 3 is a top view of a truck frame constructed in accordance with the present invention.

FIG. 4 is a side view of the truck frame of FIG. 3.

FIG. 5 is an enlarged sectional view taken along line 5—5 of FIG. 4.

FIG. 6 is a view like FIG. 5 and shows an alternate embodiment.

FIG. 7 is an enlarged view of a portion of FIG. 4.

FIG. 8 is a sectional view taken along 8—8 of FIG. 7.

FIG. 9 is a sectional view taken along line 9—9 of FIG. 7.

FIG. 10 is a sectional view taken along line 10—10 of FIG. 7.

DETAILED DESCRIPTION

Prior Art

Figure 1:
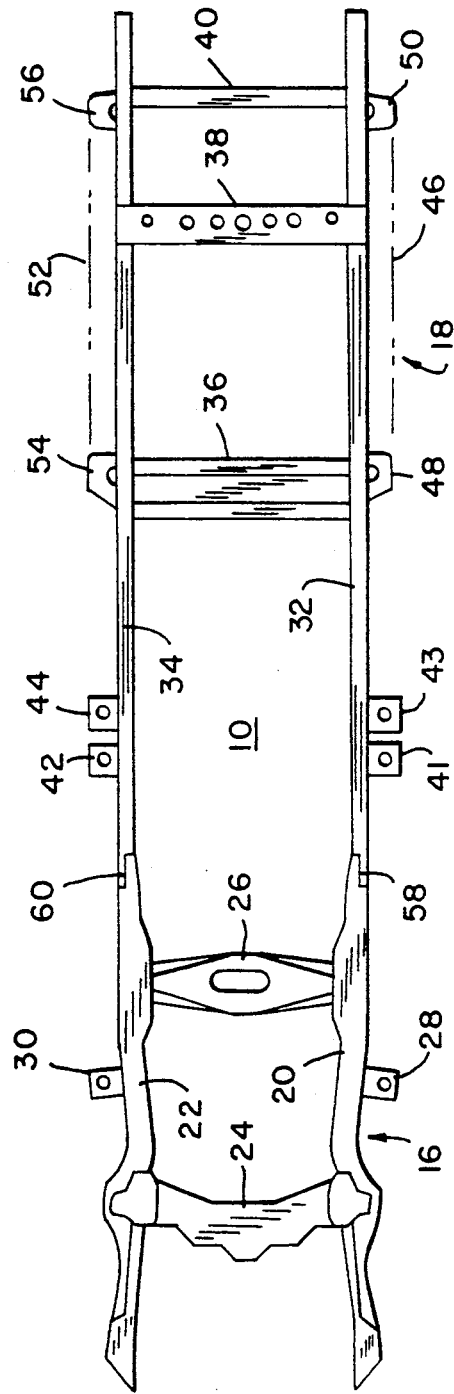
FIG. 1 is a top view of a truck frame known in the prior art.
Figure 2:
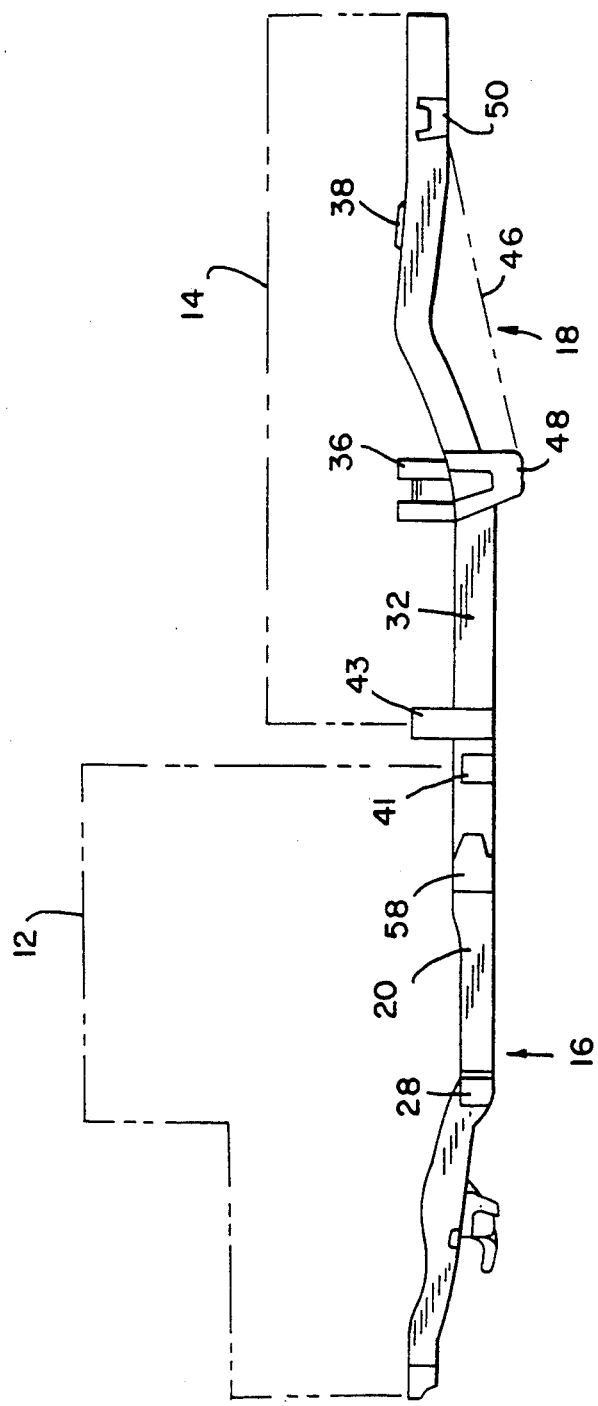
FIG. 2 is a side view of the truck frame of FIG. 1.

FIGS. 1 and 2 show a truck frame 10 for supporting the non-continuous, structural components of a truck, the components including a front cab 12 and a rear load box 14. Frame 10 includes a front frame 16 supporting front cab 12, and a rear frame 18 supporting front cab 12 and rear load box 14. Front frame 16 includes left and right siderails 20 and 22, and cross members 24, 26 extending laterally therebetween and welded and/or riveted and/or bolted thereto. Cab supports 28 and 30 are attached to respective siderails 20 and 22 by welding, rivets, or the like. Rear frame 18 includes left and right siderails 32 and 34, and cross members 36, 38, 40 extending laterally therebetween and welded and/or riveted thereto. Supports 41 and 42 are attached to respective siderails 32 and 34 by welding, rivets, or the like, and support the rear of cab 12. Supports 43 and 44 are attached to respective siderails 32 and 34 by welding, rivets, or the like, and support the front of load box 14. A left rear spring 46 is supported between left rear spring front hanger 48 and left rear spring rear hanger 50 attached, preferably by rivets, to left siderail 32 of rear frame 18. Right rear spring 52 is supported between right rear spring front hanger 54 and right rear spring rear hanger 56 attached, preferably by rivets, to right siderail 34 of rear frame 18. Left siderails 20 and 32 are attached by welding, rivets, or the like, at joint 58 beneath front cab 12. Right siderails 22 and 34 are attached by welding, rivets, or the like, at right joint 60 beneath front cab 12. In one embodiment, the length of each of rear siderails 32 and 34 is about eleven to eleven and one-half feet.

Present Invention

FIGS. 3 and 4 illustrate the present invention and use like reference numerals from FIGS. 1 and 2 where appropriate to facilitate understanding. In the present invention, the truck rear frame 18 of FIGS. 1 and 2 is split into a front portion 70 supporting front cab 12 and rear load box 14, and a rear portion 72 supporting rear load box 14. Front portion 70 has left and right siderails 74 and 76 attached by welding, rivets, or the like, to siderails 20 and 22 of front frame 16 at joints 58 and 60, as in FIG. 1. Rear portion 72 has left and right siderails 78 and 80 having cross members 36, 38, 40 extending laterally therebetween and welded and/or riveted thereto. Siderails 78 and 80 are attached to siderails 74 and 76 at respective left and right overlap joints 82 and 84, preferably by the same rivets which attach spring hangers 48 and 54, or alternatively or additionally by welding, controlled deformation to achieve a mechanical lock, adhesive bonding, or the like.

Left joint 82 has a front end 86 at the front of siderail 78 of rear portion 72, and a rear end 88 at the rear of siderail 74 of front portion 70. Right joint 84 has a front end 90 at the front of siderail 80 of rear portion 72, and a rear end 92 at the rear of siderail 76 of front portion 70. Front ends 86 and 90 of respective joints 82 and 84 are immediately forward of respective rear spring front hangers 48 and 54. The rear ends 88 and 92 of joints 82 and 84 are immediately rearward of respective rear spring front hangers 48 and 54. Cross member 36 extends between joints 82 and 84. Front cab 12 and rear load box 14 face each other at a gap 94 of discontinuity, which gap is above front portion 70 of the rear frame. Front ends 86 and 90 of joints 82 and 84 are rearward of gap 94. Cab support 41 and load box support 43 are attached to siderail 74, preferably by welding. Cab support 42 and load box support 44 are attached to siderail 76, preferably by welding.

Each siderail 74, 76 of front portion 70 has an increased vertical section height as shown at 104, below gap 94, to provide increased support and resistance to bending at gap 94. Each siderail 78 and 80 of rear portion 72 has a reduced vertical section height, as shown at 106, at the respective rear spring rear hanger 50, 56 to reduce weight thereat. Each of the front ends of siderails 74, 76 of front portion 70 at joints 58, 60 has a given vertical section height, as shown at 108, which matches the vertical section height 108. Vertical section height 106 is less than vertical section height 108. Siderail 74 has a tapered vertical section height, providing a reduced vertical section height 108 at its forward end, an increased vertical section height 104, and a reduced vertical section height at its rear end at 88. Siderail 78 has a tapered vertical section height, providing an increased vertical section height at its forward end at 86, and a reduced vertical section height 106 at its rear end. The front end 86 of joint 82 has a greater vertical section height than the rear end 88 of the joint. The rear section of siderail 74 has a tapered vertical section height which decreases from the front end 86 of joint 82 to the rear end 88 of the joint at the rear of siderail 74. Siderail 78 has a front section with a tapered vertical section height which increases from the rear end 88 of joint 82 to the front end 86 of the joint at the front of siderail 78. Right siderails 76 and 80 are comparable.

The invention enables the siderails of the front and rear portions 70 and 72 to have different cross-sectional shapes for differing strength, load, and bending resistance requirements, and enabling cost-effective structure satisfying same without the above noted penalties such as excess material or stock being carried in remaining sections where unneeded. In FIG. 5, siderail 74 is a C-shaped member with web section 110 extending vertically between top and bottom end segments 112 and 114 having inner inwardly turned lipped flanges 116 and 118. Siderail 78 is nested within siderail 74 at overlap joint 82 and is a C-shaped member having a web section 120 extending vertically between top and bottom end segments 122 and 124, which end segments do not have inner inwardly turned lipped flanges such as 116, 118.

In another embodiment as shown in FIG. 6, siderail 78a of rear portion 78 has a hat-shape cross-section of reduced stock thickness, with sections 126 and 128 extending vertically between a top end segment 130 and lower horizontal flange segments 132 and 134. Siderail 74a of front portion 70 is nested within siderail 78a and has a web section 136 extending vertically between top and bottom end segments 138 and 140 having inwardly turned lipped flanges 142 and 144.

The increased vertical height and/or thinning of web section 110, FIG. 5, or web section 136, FIG. 6, at 104, FIG. 4, may subject the web section of the siderail to oil-canning. Cab support 41 and load box support 43 are welded to siderail 74 at respective weld beads 146 and 148, FIG. 7. Supports 41 and 43, and their respective weld beads, stiffen the web section against oil-canning. Formed vertical ribs 150 and 152 on siderail 74 are provided to protect weld bead 146 of the lower height support 41 against oil-canning of web section 110. The ribs in combination with weld beads 146 and 148 further stabilize the siderail web section.

Overlap joints 82 and 84 provide double stock thickness at rear spring front hangers 48 and 54. This is particularly desirable because the rear spring front hangers are highly stressed areas. Rivets are usually used for attaching the rear spring front hangers to the siderails of the frame. The overlap joints 82, 84 enable the noted double stock for enhanced strength rivet attachment, and also allows minimum required gauge material fore and aft of the joint. The joint also enables elimination of prior forming of strengthening ribs around the rear spring front hanger rivets and reduces the expense of pierce-after-form requirements between such ribs.

The invention enables wide lipped flanges such as 116, 118 and deep thinner web sections such as 110 for the high bending moment area at gap 94 between front cab 12 and rear load box 14, without carrying the extra blank stock on siderail 78 which does not need same. The invention enables siderail 78 to be a different gauge and/or lighter weight material than siderail 74. In one embodiment, aluminum or a lighter gauge or lower strength steel may be used for siderails 78, 80 of rear portion 72. Alternately, or in combination, siderail 78 is thinner than siderail 74, in addition to having a lesser height web section 120 than web section 110 of siderail 74. Furthermore, the web section heights may be varied from a maximum as shown at 104 to a minimum as shown at 106, to localize and maximize the vertical section height where needed, and to localize and minimize the vertical section height where unneeded, reducing the penalty of extra material or section stock otherwise carried.

In a particularly desirable implementation, the continuous one-piece siderail 32 of FIG. 1 is replaced by two six foot siderails 74, 78 of FIG. 3, which enables near 100% steel utilization. Sheet steel is available in six foot coiled rolls, and may be cut off with a knife edge or other cutting tool, after which the cut-off sheet is formed to the C-shaped siderail section shown in FIG. 5. Use of a coil-fed cut-off tool or coil-fed blanking eliminates the steel waste in prior sheet or strip blanking of rear frame siderails. The present invention also eliminates a separate kick-up operation for vertical offsets, without decreasing the steel utilization factor. To provide the vertical offset at 154, FIG. 4, of the truck frame at the rear wheel, the invention enables the use of a coil-fed cut-off tool having a given shape to provide the noted vertical offset 154 during the cutting operation from the roll. Besides the manufacturing cost savings, elimination of the subsequent, separate kick-up forming step is desirable for improving strength by minimizing the strain and deformation in the material otherwise caused by such kick-up operation. This allows siderails to be formed from higher strength steel which would otherwise be subject to splitting.

In the preferred embodiment, the truck rear frame provided by portions 70 and 72 has a left side provided by left siderail 74, left joint 82, and left siderail 78, all lying in substantially the same fore-aft left vertical plane. Rear end 88 of joint 82 is substantially directly behind front end 86 of joint 82 without substantial diagonal or lateral offset. The truck rear frame has a right side provided by right siderail 76, right joint 84, and right siderail 80 all lying in substantially the same fore-aft right vertical plane without substantial diagonal or lateral offset. Rear end 92 of joint 84 is spaced substantially directly behind front end 90 of joint 84 without substantial diagonal or lateral offset. The noted left and right sides extend substantially parallel to each other such that any convergence or divergence is less than about 10°. The portions of siderails 74 and 78 at joint 82 and the portions of siderails 76 and 80 at joint 84 are all substantially coplanar.

It is recognized that various equivalents, alternatives and modifications are possible within the scope of the appended claims.

We claim:

1. A truck rear frame for supporting the non-continuous, structural components of a truck, the components including a front cab and a rear load box, said rear frame being rearward of and attached to a front frame supporting the front cab, said rear frame having a rear spring front hanger and a rear spring rear hanger for supporting a rear spring therebetween, said rear frame comprising:

a front portion for supporting the front cab and the rear load box;

a rear portion for supporting the rear load box;

said front portion being a structural component formed separately from said rear portion but attached thereto at about said rear spring front hanger, wherein said front and rear portions have sections attached at an overlap joint having a front end at the front of said rear portion, and a rear end at the rear of said front portion, and wherein said front end of said joint is forward of said rear spring front hanger, and said rear end of said joint is rearward of said rear spring front hanger.

2. The invention according to claim 1 wherein said front and rear portions are of different cross-sectional shapes.

3. The invention according to claim 2 wherein said front portion has a C-shape cross-section with a web section extending vertically between top and bottom end segments each having an inwardly turned lipped flange, and said rear portion has a C-shape cross-section within said front portion and having a web section extending vertically between top and bottom end segments which terminate without inwardly turned lipped flanges.

4. The invention according to claim 2 wherein said rear portion has a hat-shape cross-section, and said front portion has a C-shape cross-section within said hat-shape cross-section.

5. The invention according to claim 1 wherein said front and rear portions are of different gauge material.

6. The invention according to claim 1 wherein said front and rear portions are of different materials.

7. The invention according to claim 1 wherein one of said front and rear portions of said rear frame has a hat-shape cross-section.

8. The invention according to claim 7 wherein said rear portion of said rear frame has said hat-shape cross-section.

9. The invention according to claim 1 wherein said front and rear portions of said rear frame have respective vertical sections in overlapped contact with each other at said overlap joint.

10. The invention according to claim 1 wherein said rear spring front hanger and said front of said rear portion of said rear frame and said rear of said front portion of said rear frame are all attached to each other by the same attachment means.

11. A truck rear frame for supporting the non-continuous, structural components of a truck, the components including a front cab and a rear load box, said rear frame being rearward of and attached to a front frame supporting the front cab, said rear frame having a left rear spring front hanger and a left rear spring rear hanger for supporting a left rear spring therebetween, and a right rear spring front hanger and a right rear spring rear hanger for supporting a right rear spring therebetween, said rear frame comprising:

a front portion having left and right siderails for supporting the front cab and the rear load box;

a rear portion having left and right siderails for supporting the rear load box;

each siderail of said front portion being a structural component formed separately from the respective siderail of said rear portion but attached thereto at right and left joints, such that said rear frame has a left side provided by said left siderail of said front portion, said left joint, and said left siderail of said rear portion, said rear frame has a right side provided by said right siderail of said front portion, said right joint, and said right siderail of said rear portion, said left joint has a front end at the front of said left siderail of said rear portion, said left joint has a rear end at the rear of said left siderail of said front portion, said right joint has a front end at the front of said right siderail of said rear portion, said right joint has a rear end at the rear of said right siderail of said front portion, said front end of said left joint is in substantially the same fore-aft left vertical plane as said rear end of said left joint, such that said rear end of said left joint is spaced substantially directly behind said front end of said left joint without substantial diagonal or lateral offset, said front end of said right joint is in substantially the same fore-aft right vertical plane as said rear end of said right joint, such that said rear end of said right joint is spaced substantially directly behind said front end of said right joint without substantial diagonal or lateral offset.

12. The invention according to claim 11 wherein:
said left siderail of said front portion, said left joint, and said left siderail of said rear portion all lie substantially in the same fore-aft left vertical plane and extend front to rear without substantial lateral offset;

said right siderail of said front portion, said right joint, and said right siderail of said rear portion all lie substantially in the same fore-aft right vertical plane and extend front to rear without substantial lateral offset.

13. The invention according to claim 11 wherein the section of said left siderail of said front portion at said left joint and the section of said left siderail of said rear portion at said left joint and the section of said right siderail of said front portion at said right joint and the section of said right siderail of said rear portion at said right joint are all substantially coplanar.

14. The invention according to claim 13 wherein said left and right fore-aft vertical planes are substantially parallel to each other.

15. A truck rear frame for supporting the non-continuous, structural components of a truck, the components including a front cab and a rear load box facing each other at a gap of discontinuity, said rear frame being rearward of and attached to a front frame supporting the front cab, said rear frame having a left rear spring front hanger and a left rear spring rear hanger for supporting a left rear spring therebetween, and a right rear spring front hanger and a right rear spring rear hanger for supporting a right rear spring therebetween, said rear frame comprising:

a front portion for supporting the front cab, the rear load box, the left rear spring front hanger and the right rear spring front hanger, said front portion comprising left and right siderails, said front portion being below said gap of discontinuity;

a rear portion for supporting the rear load box, the left rear spring front hanger, the left rear spring rear hanger, the right rear spring front hanger and the right rear spring rear hanger, said rear portion comprising left and right siderails and one or more cross members extending laterally therebetween;

each siderail of said front portion being a structural component formed separately from the respective siderail of said rear portion but attached thereto at respective left and right joints, such that said left joint has a front end at the front of said left siderail of said rear portion, said left joint has a rear end at the rear of said left siderail of said front portion, said right joint has a front end at the front of said right siderail of said rear portion, said right joint has a rear end at the rear of said right siderail of said front portion, said front end of said left joint is rearward of said gap and forward of said left rear spring front hanger, said rear end of said left joint is rearward of said left rear spring front hanger, said front end of said right joint is rearward of said gap and forward of said right rear spring front hanger, said rear end of said right joint is rearward of said right rear spring front hanger.

16. The invention according to claim 15 wherein:
said left siderail of said front portion has a section below said gap of a first vertical section height;

said left siderail of said rear portion has a section at said left rear spring rear hanger of a second vertical section height;

said second vertical section height is less than said first vertical section height;

said right siderail of said front portion has a section below said gap of said first vertical section height;

said right siderail of said rear portion has a section at said right rear spring rear hanger of said second vertical section height.

17. The invention according to claim 15 wherein:

said left siderail of said front portion has a rear section with a tapered vertical section height which decreases from said front end of said left joint to said rear end of said left joint at the rear of said left siderail of said front portion;

said left siderail of said rear portion has a front section with a tapered vertical section height which increases from said rear end of said left joint to said front end of said left joint at the front of said left siderail of said rear portion;

said right siderail of said front portion has a rear section with a tapered vertical section height which decreases from said front end of said right joint to said rear end of said right joint at the rear of said right sidewall of said front portion;

said right siderail of said rear portion has a front section with a tapered vertical section height which increases from said rear end of said right joint to said front end of said right joint at the front of said right siderail of said rear portion.

18. The invention according to claim 15 wherein:

said left siderail of said front portion has a rear section with a vertical height which is greater at said front end of said left joint than at said rear end of said left joint;

said left siderail of said rear portion has a front section with a vertical height which is greater at said front end of said left joint than at said rear end of said left joint;

said right siderail of said front portion has a rear section with a vertical height which is greater at said front end of said right joint than at said rear end of said right joint;

said right siderail of said rear portion has a front section with a vertical height which is greater at said front end of said right joint than at said rear end of said right joint.

19. The invention according to claim 15 wherein one of said cross members extends laterally between and is attached to said left and right siderails at said left and right joints.

20. The invention according to claim 19 wherein:

said left siderail of said front portion of said rear frame and said left siderail of said rear portion of said rear frame have respective vertical sections in overlapped contact with each other at said left joint;

said right siderail of said front portion of said rear fame and said right siderail of said rear portion of said rear frame have respective vertical sections in overlapped contact with each other at said right joint;

said left rear spring front hanger and said front of said left siderail of said rear portion of said rear frame and said rear of said left siderail of said front portion of said rear frame and the left end of said one cross member are all attached to each other by the same attachment means;

said right rear spring front hanger and said front of said right siderail of said rear portion of said rear frame and said rear of said right siderail of said front portion of said rear frame and the right end of said one cross member are all attached to each other by the same attachment means.

21. A truck rear frame for supporting the non-continuous, structural components of a truck, the components including a front cab and a rear load box, said rear frame being rearward of and attached to a front frame supporting the front cab, said rear frame comprising:

a front portion having left and right siderails for supporting the front cab and the rear load box;

a rear portion having left and right siderails for supporting the rear load box;

each siderail of said front portion being a structural component formed separately from the respective siderail of said rear portion but attached thereto at left and right joints, such that said rear frame has a left side provided by said left siderail of said front portion, said left joint, and said left siderail of said rear portion, said rear frame has a right side provided by said right siderail of said front portion, said right joint, and said right siderail of said rear portion;

the siderails of one of said front and rear portions of said rear frame having a hat-shape cross-section.

22. The invention according to claim 21 wherein said left and right siderails of said rear portion of said rear frame have said hat-shape cross-section.

23. A truck rear frame for supporting the non-continuous, structural components of a truck, the components including a front cab and a rear load box, said rear frame being rearward of and attached to a front frame supporting the front cab, said rear frame having a rear spring front hanger and a rear spring rear hanger for supporting a rear spring therebetween, said rear frame comprising:

a front portion for supporting the front cab and the rear load box;

a rear portion for supporting the rear load box;

said front portion being a structural component formed separately from said rear portion but attached thereto at about said rear spring front hanger, wherein said front cab and said rear load box face each other at a gap of discontinuity, which gap is above said front portion of said rear frame, said front and rear portions have sections attached at an overlap joint having a front end at the front of said rear portion, and a rear end at the rear of said front portion, and wherein said front end of said joint is rearward of said gap, said front end of said joint is between said gap and said rear spring front hanger, and said rear spring front hanger is between said front end of said joint and said rear end of said joint.

24. The invention according to claim 23 wherein said front and rear portions have sections of different vertical section height.

* * * * *